Patented Mar. 21, 1944

2,344,776

UNITED STATES PATENT OFFICE 2,344,776

RUBBER HYDROCHLORIDE COMPOSITION

George E. Hulse, Passaic, N. J., assignor to United States Rubber Company, New York, N. Y., a corporation of New Jersey No Drawing. Application March 26, 1940, Serial No. 326,051

8 Claims. (Cl. 260—735)

This invention relates to new compositions of matter comprising rubber-hydrogen chloride reaction products, particularly to transparent films and lacquers.

An object of the invention is to provide a new class of photochemical inhibitors for rubber hydrochloride films, particularly for transparent rubber hydrochloride films. Other objects will be apparent from the following description.

Hitherto the effectiveness of chemical stabilizers of rubber hydrochloride has been limited by their lack of solubility in the film, their volatility from the film, or discoloration of the film on aging.

The present invention provides chemicals which are compatible with rubber hydrochloride and which enable the production of films which are clear and free from haze or color and which do not discolor during light aging. The chemicals furthermore do not impart any odor to the films, which makes their use as wrappers for food materials desirable. Compared with other chemicals previously used for the purpose the films of the present invention retain their usefulness longer because of better retention of strength and flexibility.

Broadly the invention comprises the use, as chemical stabilizers in rubber hydrochloride compositions, of open chain polyalkylene polyamine compounds composed solely of alkylene and amine groups. Typical of such compounds, among others, is $NH_2C_2H_4NH\ C_2H_4NH_2$ (diethylene triamine).

The rubber hydrochloride may be produced by passing hydrogen chloride gas into a rubber cement, as disclosed by Bradley and McGavack (U. S. Patent 1,519,659), or by reacting rubber with hydrogen chloride gas at a low temperature (disclosed by Gebauer-Fullnegg and Moffet U. S. Patent 1,980,396) or by any other method.

If the rubber hydrochloride is sufficiently soluble it can be made into a cement to which the polyalkylene polyamine is added in such amount as has been determined by experiment to give effective protection against light ageing. The cement may then be cast into film or used as a lacquer.

Some products of rubber and hydrogen chloride are not sufficiently soluble to form spreading cements. The polyalkylene polyamine stabilizers may be incorporated into such rubber hydrochloride by milling on a rubber mill. Films can then be produced by calendering the mixture.

Rubber hydrochloride films having incorporated therein the polyalkylene polyamine in accordance with the invention have been found to be more resistant to deterioration upon exposure to light than films containing no added stabilizer.

The following table gives an example of the relative resistance to light ageing of films containing polyethylene polyamine, and an unstabilized film.

| Chemical (2 pts. on 100 of rubber hydrochloride) | Fadeometer hrs. exposure until brittle | Diffused light days exposed until brittle |
|---|---|---|
| None | 22 | 26 |
| Diethylene triamine | 35 | 47 |
| Triethylene tetramine | 42 | 55 |
| Polyethylene polyamine mixture (boiling above 200° C.) | 36 | 47 |

The films (thickness .001 inch) were respectively aged until brittle in a standard Fadeometer at 110° F., and in daylight behind a window having a southern exposure.

The polyalkylene polyamines may be prepared by known methods, one such consisting in reacting ethylene dichloride with ammonia under controlled conditions. The resulting mixture of several polyethylene polyamines may be used, or different components or fractions may be isolated by distillation.

The new stabilizers may be used in amounts up to 5% by weight with rubber hydrochlorides having any hydrogen chloride content in the range commercially available, and especially with rubber hydrochloride having a hydrogen chloride content of over 30% and being in the form of transparent films suitable for photographic film or for wrapping purposes.

The rubber hydrochloride stabilized by the chemicals disclosed herein may be used in various forms and for the various purposes for which rubber hydrochloride compositions are generally known to be used.

Having thus described my invention, what I claim and desire to protect by Letters Patent is:

1. A rubber hydrochloride composition containing an open-chain polyalkylene polyamine composed solely of alkylene and amine groups, and in which the terminal groups are primary amine groups.

2. A rubber hydrochloride composition containing an open-chain polyethylene polyamine composed solely of ethylene and amine groups, and in which the terminal groups are primary amine groups.

3. A pellicle comprising a rubber hydrochloride composition containing an open-chain polyalkylene polyamine composed solely of alkylene and amine groups, and in which the terminal groups are primary amine groups.

4. A transparent pellicle comprising a rubber hydrochloride composition containing an open-chain polyethylene polyamine composed solely of ethylene and amine groups, and in which the terminal groups are primary amine groups.

5. A rubber hydrochloride composition containing open-chain diethylene triamine.

6. A rubber hydrochloride composition containing open-chain triethylene tetramine.

7. A rubber hydrochloride composition containing open-chain polyethylene polyamine liquid having a boiling point above 200° C.

8. A product composed at least in part of rubber hydrochloride stabilized with an open-chain polyalkylene polyamine composed solely of alkylene and amine groups, and in which the terminal groups are primary amine groups.

GEORGE E. HULSE.